(12) United States Patent
O'Neil

(10) Patent No.: US 7,009,943 B2
(45) Date of Patent: Mar. 7, 2006

(54) CONFERENCING NETWORK RESOURCE MANAGEMENT FOR CALL CONNECTIVITY

(75) Inventor: Timothy M. O'Neil, Austin, TX (US)

(73) Assignee: Polycom, Inc., Milpitas, CA (US)

( * ) Notice: Subject to any disclaimer, the term of this patent is extended or adjusted under 35 U.S.C. 154(b) by 950 days.

(21) Appl. No.: 10/032,979

(22) Filed: Nov. 2, 2001

(65) Prior Publication Data

US 2002/0085490 A1  Jul. 4, 2002

Related U.S. Application Data

(60) Provisional application No. 60/245,728, filed on Nov. 2, 2000.

(51) Int. Cl.
  *H04L 12/16* (2006.01)
(52) U.S. Cl. ........................... 370/260; 709/204
(58) Field of Classification Search ........ 370/260–263, 370/270, 401, 402, 352–358, 395.21, 395.4, 370/395, 4, 401 M; 709/248, 102, 204; 348/14.01, 348/14.08, 14.09; 346/14.1
See application file for complete search history.

(56) References Cited

U.S. PATENT DOCUMENTS

| | | | |
|---|---|---|---|
| 5,737,010 A | 4/1998 | Yachi et al. ................. 345/15 |
| 5,784,561 A * | 7/1998 | Bruno et al. ................ 709/204 |
| 6,005,845 A | 12/1999 | Svennesson et al. |
| 6,018,360 A | 1/2000 | Stewart et al. |
| 6,035,026 A | 3/2000 | Kim |
| 6,282,278 B1 | 8/2001 | Doganata et al. |
| 6,324,169 B1 | 11/2001 | Roy |
| 6,411,605 B1 * | 6/2002 | Vance et al. ................ 370/261 |
| 6,614,781 B1 | 9/2003 | Elliott et al. ................. 370/352 |
| 6,646,997 B1 | 11/2003 | Baxley et al. ............... 370/260 |
| 6,687,234 B1 | 2/2004 | Shaffer et al. .............. 370/260 |
| 6,816,903 B1 | 11/2004 | Rakoshitz et al. .......... 709/226 |
| 6,879,565 B1 | 4/2005 | Baxley et al. .............. 370/261 |
| 2001/0005382 A1 | 6/2001 | Cave et al. |

OTHER PUBLICATIONS

A Primer on the H.323 Series Standard, downloaded on Oct. 9, 2000, from http://www.databeam.com/h323/h323primer.html.
The Challenge of H.323 Video Conferencing with Network Address Translation. A press release from Sep. 25, 2000, downloaded on Oct. 10, 2000, from http://www.s-vision.com/products/Glasses/product/Whitepaper.html.
NAT Conferencing Solution Announced. A press release from Sep. 11, 2000. Downloaded on Oct. 10, 2000 from http://www.s-vision.com/corporate/pr/20000911.html.
Sorenson Glasses(TM) Gatekeeper product overview. Downloaded on Oct. 10, 2000 from http://www.s-vision.com/products/Glasses/.
Sorenson Glasses(TM) Gatekeeper Technical Specifications. Downloaded on Oct. 10, 2000 from http://www.s-vision.com/products/Glasses/product/specs.html.

* cited by examiner

Primary Examiner—Brenda Pham
(74) Attorney, Agent, or Firm—Wong, Cabello, Lutsch, Rutherford & Brucculeri, LLP

(57) ABSTRACT

A system and method that provides reliable connectivity of conference calls by ensuring that sufficient network resources are available at the time of the requested conference calls. The system includes multiple endpoints for requesting conference calls, and a gatekeeper bound to a resource scheduler such that requested conference calls are scheduled via the scheduler according to connectivity policies maintained by the gatekeeper.

9 Claims, 3 Drawing Sheets

CONFERENCING NETWORK RESOURCE MANAGEMENT FOR CALL CONNECTIVITY

CROSS REFERENCE TO RELATED APPLICATIONS

This application claims the benefit of Provisional Patent Application Ser. No. 60/245,728 filed on Nov. 2, 2000, entitled "Conference Network Resource Management And Optimization" and is also related to co-owned patent application Ser. No. 10/053,310, filed on Nov. 2, 2001, entitled "Conferencing Network Resource Optimization For Multi-Point Conferences" which are hereby incorporated by reference.

BACKGROUND

1. Field of the Invention

The present invention relates generally to management of conferencing networks, and more particularly to applications for managing network resources to ensure connectivity of scheduled conferences.

2. Description of the Background Art

H.323 is an umbrella recommendation from the International Telecommunications Union (ITU) that describes standards for multimedia communications over IP-based local area networks (LANs) that do not provide a guaranteed Quality of Service (QoS). Common LAN configurations utilize packet-switched TCP/IP and IPX over Ethernet, Fast Ethernet, and Token Ring technologies. Therefore the H.323 standards are commonly used in the implementation of enterprise videoconferencing networks.

An important component of an H.323 compliant network is a gatekeeper, which acts as a central control point for all calls within its zone and provides call control services to registered endpoints. A gatekeeper interacts with other H.323 network components, such as terminals, gateways, and multi-point control units (MCUs). One of the important call control functions performed by a gatekeeper is bandwidth management, which typically includes limiting the total conferencing bandwidth to a fraction of the total available to allow the remaining capacity to be used for other activities. Currently, multi-point and point-to-point calls are typically scheduled without regard to the gatekeeper bandwidth management and call authorization policies. As a result, bandwidth limitation may often result in a refusal to connect an attempted conference call when a certain enterprise network threshold is reached. Thus, what is needed is a method for reliably connecting scheduled conference calls.

SUMMARY

The conferencing network resource management and optimization system of the present invention configures a gatekeeper (or a SIP proxy) and a resource scheduler such that requested conference calls are scheduled via the scheduler, and according to the network Quality of Service and connectivity policies maintained by the gatekeeper or the SIP proxy. The disclosed methods, which utilize the system as described, ensure that sufficient network resources are available at the time of the requested conference call and consequently ensure a reliable and successful conference.

In an alternate aspect of the invention, the system is configured such that network management applications are provided at both an enterprise network level and at a service provider level. The management applications are operative to exchange network configuration and policy information, thus affording the capability to co-manage endpoint devices and LAN and WAN resources. An additional benefit provided by intercommunicating H.323 video network management applications is the resolution or translation of internal private IP addresses to their effective public IP address. The enterprise management application is operative to communicate with the service provider management application to provide dynamic network address translation (NAT) without the need for manual mapping of addresses.

DETAILED DESCRIPTION OF THE INVENTION

Scheduling and/or calendar applications are often used in enterprises, especially those with multiple campuses or work sites, in order to aid coordination of conferences or other collaborations among desired participants. These applications typically offer the ability to view the calendars of others on the enterprise network, as well as send conference invitations and subsequently update conference participant calendars upon acceptance of an invitation. Enterprises often use third party scheduling applications or may use proprietary applications developed for unique needs.

A method and system providing reliable connectivity of conference calls regulated by the H.323 audio and video conferencing protocol or Session Initiation Protocol (SIP) is first described. The system ensures that adequate network resources are available for a requested conference by binding an enterprise scheduling application with gatekeeper QoS/connectivity policies maintained by a network administrator. Through this conferencing network architecture, an endpoint can request network resources via the scheduling application, which can then access the gatekeeper policies and call authorization and management functionality. The gatekeeper can verify that adequate resources are available to complete the requested conference call and can ensure that the requested call is given priority over competing non-scheduled calls, thus ensuring successful initiation of the requested conference. Alternatively, the gatekeeper may be replaced by an SIP proxy in which scheduling applications (described below) are bound to the SIP proxy.

Figure 1:
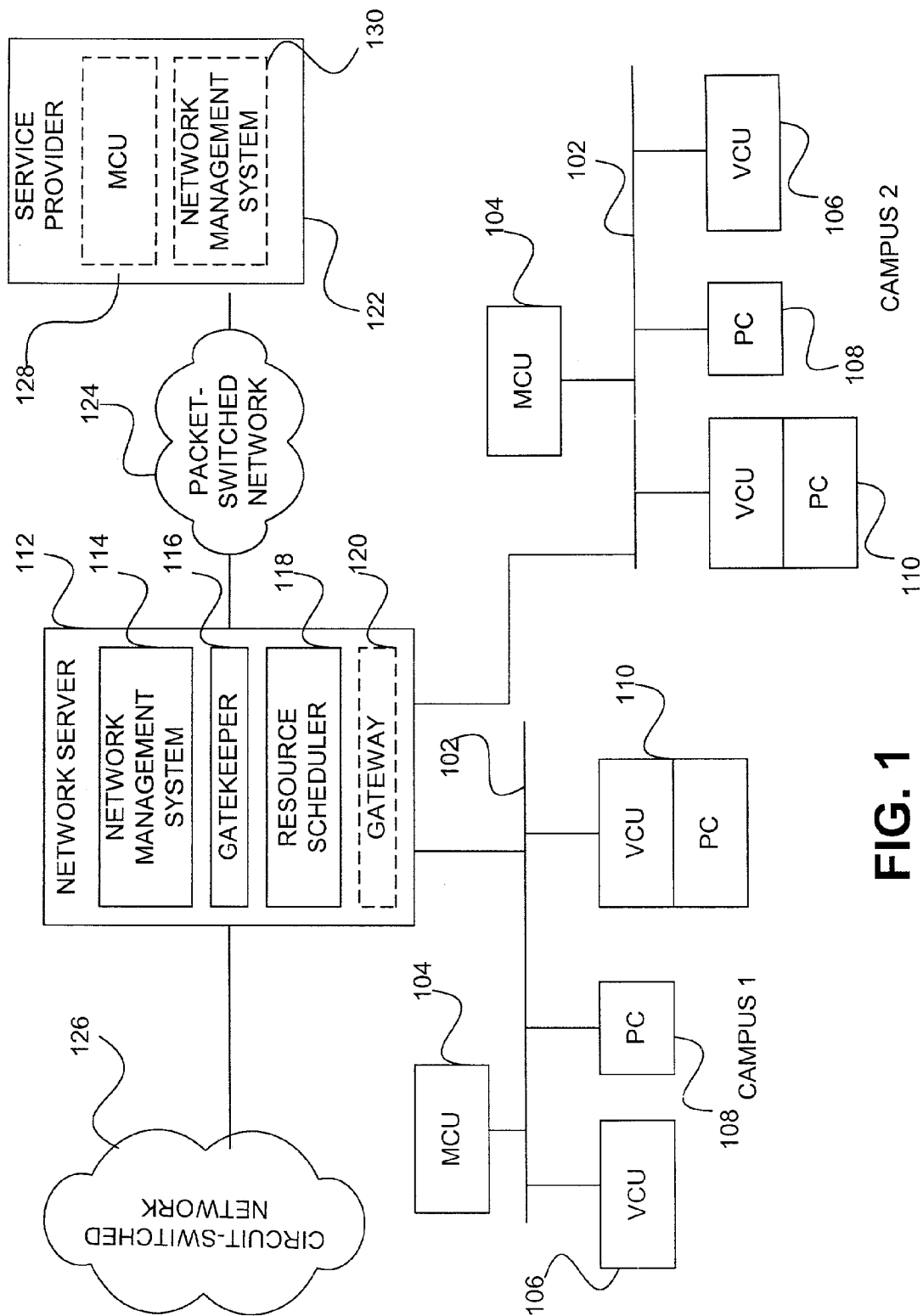
FIG. 1 is a block diagram of an enterprise network, in accordance with the present invention.

FIG. 1 depicts an exemplary operating environment of the system and methods described herein. An enterprise network 100 is depicted comprising at least two campuses, campus 1 and campus 2. Each campus comprises a LAN 102 interconnecting an MCU 104 and various workstations. The LANs 102 may utilize well-known technology such as Ethernet or any other suitable network technology, and employ appropriate communication protocols, for example TCP/IP. As is known in the art, an MCU supports conferences between three or more endpoints. An MCU typically includes a media controller (not shown) for, among other things, processing negotiations among endpoints and controlling audio, video, and multiplexed streams, and an optional media processor (not shown) for, among other things, processing, mixing, and switching of audio, video, and data signals. The scope of the present invention includes centralized and decentralized MCUs. A centralized MCU includes integrated media controller and media processor units. A decentralized MCU includes separate media controller and media processor units.

Each LAN 102 additionally interconnects one or more various videoconference-enabled devices, for example, a stand-alone videoconferencing unit (VCU) 106 such as the ViewStation™ MP available from Polycom, Inc. of Milpitas, Calif.; a personal computer (PC) 108; and a PC/VCU 110 combination. The PC/VCU 110 is intended to depict a videoconference-enabled PC that is configured with a microphone, camera, speakers, and an associated conferencing application, or a PC coupled with a personal videoconferencing device such as the ViaVideo™ available from Polycom, Inc. of Milpitas, Calif. The devices coupled to the LANs 102 intercommunicate through an appropriate protocol such as TCP/IP, IPX, or any other suitable communication protocol. Note also that the MCU 104 may not be a separate device as depicted in FIG. 1, but may be integrated into another device such as the VCU 106 or a network server 112.

The network server 112 includes a plurality of software applications and associated functions, and is coupled to the LAN 102 for communication with other network connected devices. The server applications may include, but are not limited to, a network management system 114, a gatekeeper 116, a resource scheduler 118, and optionally a gateway 120.

The network management system 114 manages the LAN 102 and connected devices. The network management system 114 manages hardware, for example, packet exchange monitoring and node diagnosis, and software, for example diagnosis and updating. An additional feature of the management system 114 is the capability to communicate and co-manage the resources of other network management systems 130 that reside on a service provider (SP) server 122. Exemplary functions include, but are not limited to, coordinating conference connectivity with the SP server 122 through a network 124 (preferably packet-switched), coordinating conference bandwidth management, and coordinating cascading of two or more MCUs 104 (or MCUs 128 resident at the SP server 122) together for expanding the number of endpoints in a multi-point conference.

The resource scheduler 118 is an application offering the ability, among others, to view and interact with the calendars of others on the enterprise network, as well as send conference invitations and subsequently update participant calendars upon acceptance of an invitation. In addition, the resource scheduler 118 is operative to communicate with the gatekeeper 116 upon a conference request from endpoint devices VCU 106, PC 108 or PC/VCU 110. Although the scheduler 118 is depicted as resident on the network server 112, the invention is not limited to this configuration. The functionality of the scheduler 118 may also reside in the network management system 114, on any or all of the plurality of videoconferencing-enabled devices 106, 108 or 110, or on any other workstation (not shown) on the LAN 102. The scheduler 118 is not only provided with access to the work calendars of enterprise personnel in order to coordinate the scheduling of meetings, conferences, etc., but is also provided with access to the gatekeeper connectivity policy, described below with respect to FIGS. 2 and 3. The communication between the scheduler 118 and the gatekeeper 116 facilitates the capabilities for reliable conference scheduling described herein. The gatekeeper 116 is described in detail below in reference to FIG. 2.

An optional gateway 120 may be present at the network server 112 for providing many services to network or LAN 102 endpoints such as 104–110. The gateway 120 is operative to provide interface functionality between different network types. As a network interface, the gateway 120 provides translation functionality between differing endpoints, including but not limited to translation between transmission formats, communications procedures, audio and video codecs, and possibly network address translation (NAT). In general, the gateway 120 facilitates communication between H.323 devices (or SIP devices) and analog PSTN (public-switched telephone network) devices. Thus, signal transmission between any or all of the LAN 102 connected devices 104–110 and the circuit-switched network 126 (i.e., the PSTN), may route through the optional gateway 120.

Finally, FIG. 1 depicts the network server 112 being optionally coupled to the SP server 122 through a network 124. The network server 112 and the SP server 122 may interoperate for various enterprise conference scheduling, MCU 104 cascading, bandwidth management, and other activities that may contribute to the successful integration and use of a service provider offering conferencing services.

Figure 2:
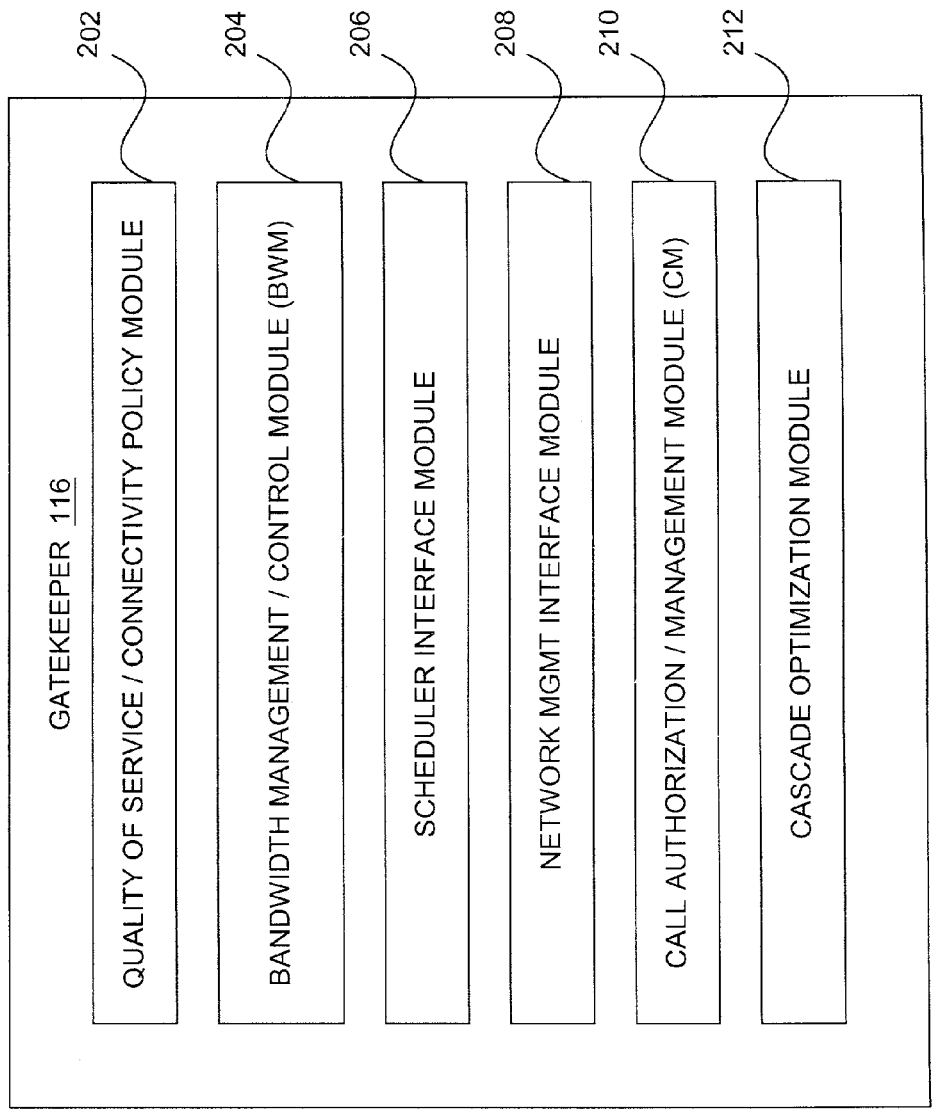
FIG. 2 is a block diagram of gatekeeper, in accordance with the present invention.

FIG. 2 depicts in block format some of the functionality of the gatekeeper 116, in accordance with one aspect of the present invention. A QoS/connectivity policy (policy) module 202 maintains the enterprise network policies set by a network administrator. These policies are intended to describe the allowed capabilities of the network and the associated network devices 104–112 (FIG. 1), and may include, among other things, call authorization and management and network bandwidth management. Examples of policy rules include but are not limited to the speeds at which various devices 104–112 are able to transmit information over the LAN 102 to the packet-switched network 124 (FIG. 1), and/or to the circuit-switched network 126 (FIG. 1); designation of which devices 104–112 at each campus are allowed to communicate with which other devices 104–112 at each campus; and designation of services that are available to various devices 104–110. Another relevant example of a gatekeeper 116 policy is the priority assigned to various types of information transmission (e.g., audio, video, data, and e-mail) that may be competing for network resources, and the amount of network bandwidth that is allocated for such transmissions. Further, policies likely differ at various times of a day and of a week.

A bandwidth management/control module (BWM) 204 is provided for supporting, among other things, bandwidth request, confirm, and reject messages; for determining whether adequate bandwidth is available to complete a call; for determining if adequate bandwidth is available upon a request for additional bandwidth from an active call; and related functions. In addition, the BWM 204 communicates with and receives inquiries and requests from the scheduler 118 (FIG. 1) based upon a conference call request from a user. The gatekeeper 116 and the scheduler 118 intercommunicate through a scheduler interface module 206, which is operative to facilitate transfer of information therebetween. In addition, the gatekeeper 116 and the network management system 114 (FIG. 1) intercommunicate through a network management interface module 208, which facilitates transfer of information therebetween.

The gatekeeper 116 is further provided with a call authorization/management module (CM) 210 that is capable of communicating with the BWM 204 and supplying information thereto. Through the CM 210, the gatekeeper 116 may maintain a list of ongoing calls and it may restrict access to network resources for certain network devices 104–110 (FIG. 1) during certain periods of time. As a result of being able to communicate with the resource scheduler 118 (FIG.

1) through the scheduler interface 206, the gatekeeper is operative to manage network resources based on call requests made through the scheduler 118 and based on the policies defined by a network administrator in the policy module 202. In addition, MCUs 104 and endpoints 106–110 within the gatekeeper 116 zone register with the gatekeeper 116 when attempting to place a call, and the gatekeeper 116 has access to network configuration information describing the LANs 102 and the devices 104–110. Thus, being privy to all of this information, the gatekeeper functionality described above is employed to ensure that sufficient network resources (i.e., bandwidth, etc.) are available to reliably connect and complete a scheduled conference call, and/or to accept or reject competing ad hoc call attempts.

The interaction between the gatekeeper 116 and the resource scheduler 118 is not limited by the configuration as described. Those skilled in the art may appreciate that alternate gatekeeper 116 configurations and functions, and additional intercommunication between the gatekeeper 116 and the scheduler 118, may provide reliable network bandwidth management and thus reliable connectivity for conference calls initiated in a network. These alternatives are thus considered within the scope of the present invention.

Another component of gatekeeper 116 is a cascade optimization algorithm 212, which is described below in reference to FIG. 3.

Figure 3:
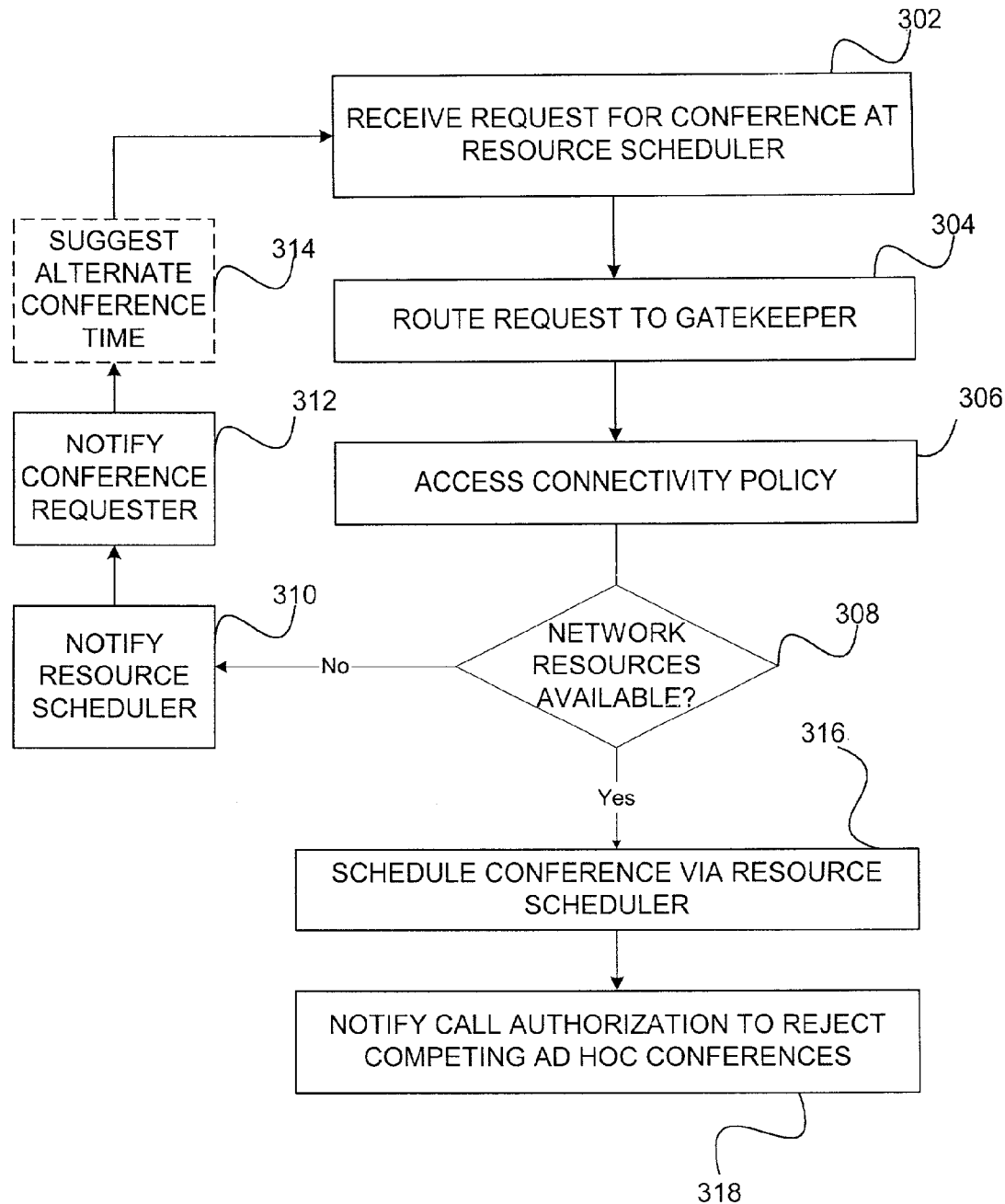
FIG. 3 is a flowchart of method steps for scheduling a conference call within a network.

FIG. 3 is a flow diagram depicting a method for scheduling a conference call within a network, wherein sufficient network resources are ensured to provide a successful conference initiation.

At step 302, users at the devices 106–110 (FIG. 1) requests a conference call, which is received by the resource scheduler 118 (FIG. 1). The request is routed to the gatekeeper 116 (FIG. 1) at step 304, whereby the requested conference registration with the gatekeeper 116 is initiated. The QoS/connectivity policy module 202 is accessed at step 306.

Since the devices 104–110 have previously registered with the gatekeeper 116 (FIG. 1) and the relevant network segments for the devices are known, the BWM 204 (FIG. 2) is capable of determining whether there are sufficient network resources available to successfully connect the requested conference call based on the policies defined in the policy module 202 (FIG. 2). The BWM 204 does this in step 308.

If sufficient resources are unavailable at the requested time and the requested conference configuration, the resource scheduler 118 (FIG. 1) is notified at step 310. The scheduler 118 then notifies the conference requester at step 312. In an optional step 314, the scheduler 118, in conjunction with the gatekeeper 116, suggests an alternate conference time to the requester, again according to the known network capacities and policies. Users at the devices 106–110 (FIG. 1) may repeat the request for a conference call at step 302.

If it is determined at step 308 that sufficient network resources are available to complete the requested conference call, then the scheduler 118 schedules the requested conference and the appropriate invitations may be transmitted to conference invitees in step 316. At step 318, the CM 210 (FIG. 2) is notified to reject any competing ad hoc conference calls that may attempt to register with the gatekeeper 116 (through scheduler 118 or via direct connection attempts), if necessary. Additional features may include notifying connected ad hoc callers shortly prior to the initiation of the scheduled call, whereupon the availability of network resources for the ad hoc call will expire. For example, a message may appear on their monitor indicating that only five minutes remain for their current call. Those skilled in the art can appreciate that a number of additional similar features may be integrated into the basic architecture described herein, and that such features are within the scope of the present invention.

It will be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A method of scheduling a conference call within a network, the method comprising:
   receiving a request for a conference call from a requestor;
   determining whether the requested conference call may be completed based on one or more network policies and based on availability of one or more invitees determined from the one or more invitees' calendar; and
   if the requested conference call may be completed based on the one or more network policies and availability of one or more invitees, scheduling the requested conference call and performing one or more of: transmitting invitations to conference invitees and updating the calendar of the one or more invitees.

2. The method of claim 1 further comprising:
   if the requested conference call may not be completed based on the one or more network policies or availability of one or more invitees, notifying the requestor that the conference call may not be completed.

3. The method of claim 2, wherein the step of notifying the requestor that the conference call may not be completed further comprises proposing at least one alternate conference time at which the requested conference call may be completed based on the one or more network policies and the availability of one or more invitees.

4. The method of claim 3 further comprising rejecting any competing ad hoc conference calls that conflict with a scheduled conference call.

5. The method of claim 4 further comprising notifying participants in an ad hoc conference call that availability of network resources used by the ad hoc conference call will expire shortly prior to initiation of the scheduled conference call.

6. The method of claim 2 further comprising rejecting any competing ad hoc conference calls that conflict with a scheduled conference call.

7. The method of claim 6 further comprising notifying participants in an ad hoc conference call that availability of network resources used by the ad hoc conference call will expire shortly prior to initiation of the scheduled conference call.

8. The method of claim 1 further comprising rejecting any competing ad hoc conference calls that conflict with a scheduled conference call.

9. The method of claim 8 further comprising notifying participants in an ad hoc conference call that availability of network resources used by the ad hoc conference call will expire shortly prior to initiation of the scheduled conference call.

\* \* \* \* \*